United States Patent [19]

Whited

[11] 4,447,771

[45] May 8, 1984

[54] CONTROL SYSTEM FOR SYNCHRONOUS BRUSHLESS MOTORS

[75] Inventor: James S. Whited, Radford, Va.

[73] Assignee: Kollmorgen Technologies Corporation, Dallas, Tex.

[21] Appl. No.: 297,676

[22] Filed: Aug. 31, 1981

[51] Int. Cl.³ .............................................. G05B 1/06
[52] U.S. Cl. ...................................... 18/661; 318/254; 318/715
[58] Field of Search ............... 318/661, 715, 254, 685; 340/347 SY

[56] References Cited

U.S. PATENT DOCUMENTS

| | | | |
|---|---|---|---|
| 3,346,791 | 10/1967 | Brook | 318/661 X |
| 3,896,356 | 7/1975 | Hoffman | 318/661 |
| 4,282,468 | 8/1981 | Barker et al. | 318/661 X |
| 4,310,790 | 1/1982 | Marquis | 318/661 X |
| 4,342,952 | 8/1982 | Bowie | 318/661 X |

FOREIGN PATENT DOCUMENTS 688976 9/1979 U.S.S.R. ............................ 318/715

OTHER PUBLICATIONS

*IEEE Transactions on Industry Applications*, "Controlled Power Angle Synchronous Motor Inverter Drive System" by Gordon R. Slemon et al., vol. 1A-9, No. 2, Mar. 1973.

Primary Examiner—B. Dobeck
Attorney, Agent, or Firm—Morgan, Finnegan, Pine, Foley & Lee

[57] ABSTRACT

A motor control system wherein the motor windings are energized by sinusoidal excitation currents synthesized from prerecorded sine values. The frequency of the winding excitation currents is synchronous with the rotor movement and the phase is a function of the rotor position with respect to the stator. The phase of the winding excitation is additionally controllable as a function of speed or some other adequate system parameter. It has further been found that the total operational speed range of the system is substantially increased by further adjusting and controlling the phase of the excitation currents as a function of the desired speed.

18 Claims, 4 Drawing Figures

CONTROL SYSTEM FOR SYNCHRONOUS BRUSHLESS MOTORS

BACKGROUND OF THE INVENTION

This invention relates to electric motor control systems, and more particularly, to motor control systems for DC brushless synchronous motors.

A DC brushless motor typically includes windings on the stator, rotating permanent magnets and a position sensing arrangement for indicating the rotor position. The winding energization is generally controlled by solid state switches that are responsive to the position indications to energize the windings in the proper commutated sequence. Motor control is achieved by controlling the magnitude of the winding excitation current. Control can be open loop or can be closed loop to control velocity, position or torque.

Although prior servo control systems using brushless DC motors have been effective in many installations, there have been limitations to the range of control that could be achieved. The developments in robotics, machine tool drives and spindle drives require smooth control over a broad range of speed, require a high smooth torque at zero speed, and require significant torque at high speeds. An object of this invention is to provide a control system for a brushless DC motor that will meet these objectives.

SUMMARY OF THE INVENTION

Two motor constants that impose limiting constraints on DC motor control systems are the torque constant $K_t$ (torque/ampere) and the back EMF constant $K_e$ (back EMF/RPM). The two constants are interrelated and therefore a system with a maximum torque constant also has a maximum back EMF constant.

Because of the interrelationship of these constants, a system designed for a maximum torque constant, to achieve good low speed torque, suffers from a reduced ability to produce much torque at high speeds. At the high end of the speed range where the back EMF is approaching maximum, the current that can be supplied to the motor is limited by the difference between the voltage on the supply bus and the back EMF. Since torque is directly related to current, the ability of the system to generate torque at high speed is severely limited due to the high back EMF. On the other hand, if the system is designed with a lower $K_e$ and $K_t$ to alleviate the high speed torque problem, the lowered torque constant results in a reduced torque at low speeds.

In addition, the maximum speed at which the motor can operate is limited by the approach of the internal back EMF to the supply voltage as a function of increasing speed. In many applications, it is desirable to extend the motor speed range. This can be accomplished by lowering the back EMF constant $K_e$ at higher speeds.

In accordance with this invention, it has been found that the constants $K_t$ and $K_e$ need not be regarded as fixed motor constants but in fact can be dynamically controlled. Thus, it becomes possible to have a maximum torque constant at low speeds when a high back EMF is not a problem and to also have a minimum back EMF constant at high speeds where the back EMF limits torque generation.

In a conventional brush type DC motor the constants $K_t$ and $K_e$ are dependent on the brush position which controls the commutation point. In such motors these constants are fixed as a practical matter. However, it has been found that with a brushless DC motor where commutation is controlled electronically it is possible to dynamically control the commutation point and thereby control the constants $K_t$ and $K_e$.

In the system according to this invention, sinusoidal excitation is used. The sine waves are synthesized incrementally according to rotor position and hence the frequency of the excitation currents is synchronous with motor rotation and the phase of the excitation is a function of rotor position with respect to the stator. The commutation point can then be shifted as desired by controlling the phase of the excitation current since this becomes the torque angle between the stator rotating field and the rotor position.

DETAILED DESCRIPTION OF THE DRAWINGS

Figure 1A:
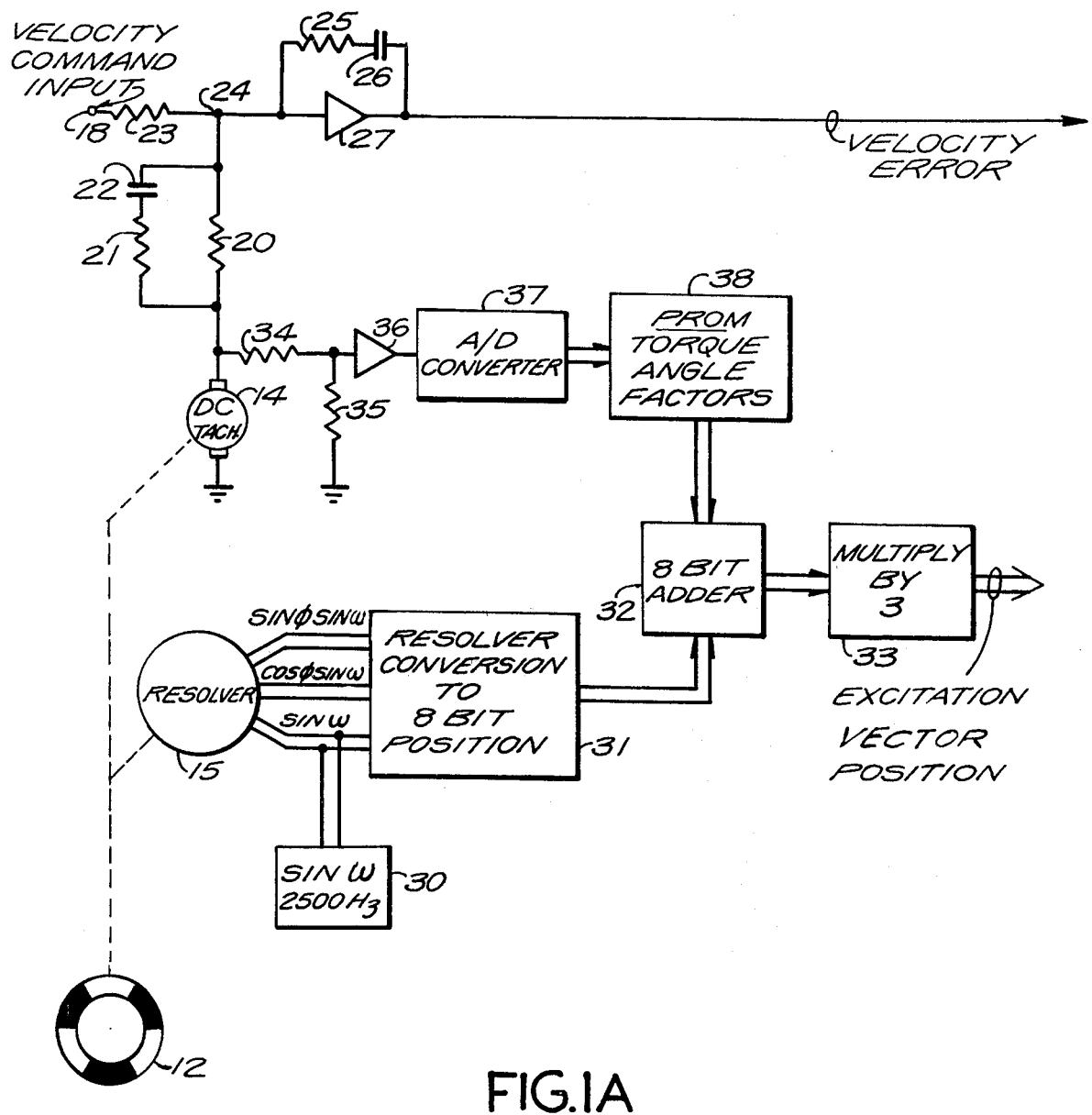
FIGS. 1A and 1B are schematic block diagrams illustrating one preferred embodiment according to the invention.
Figure 1B:
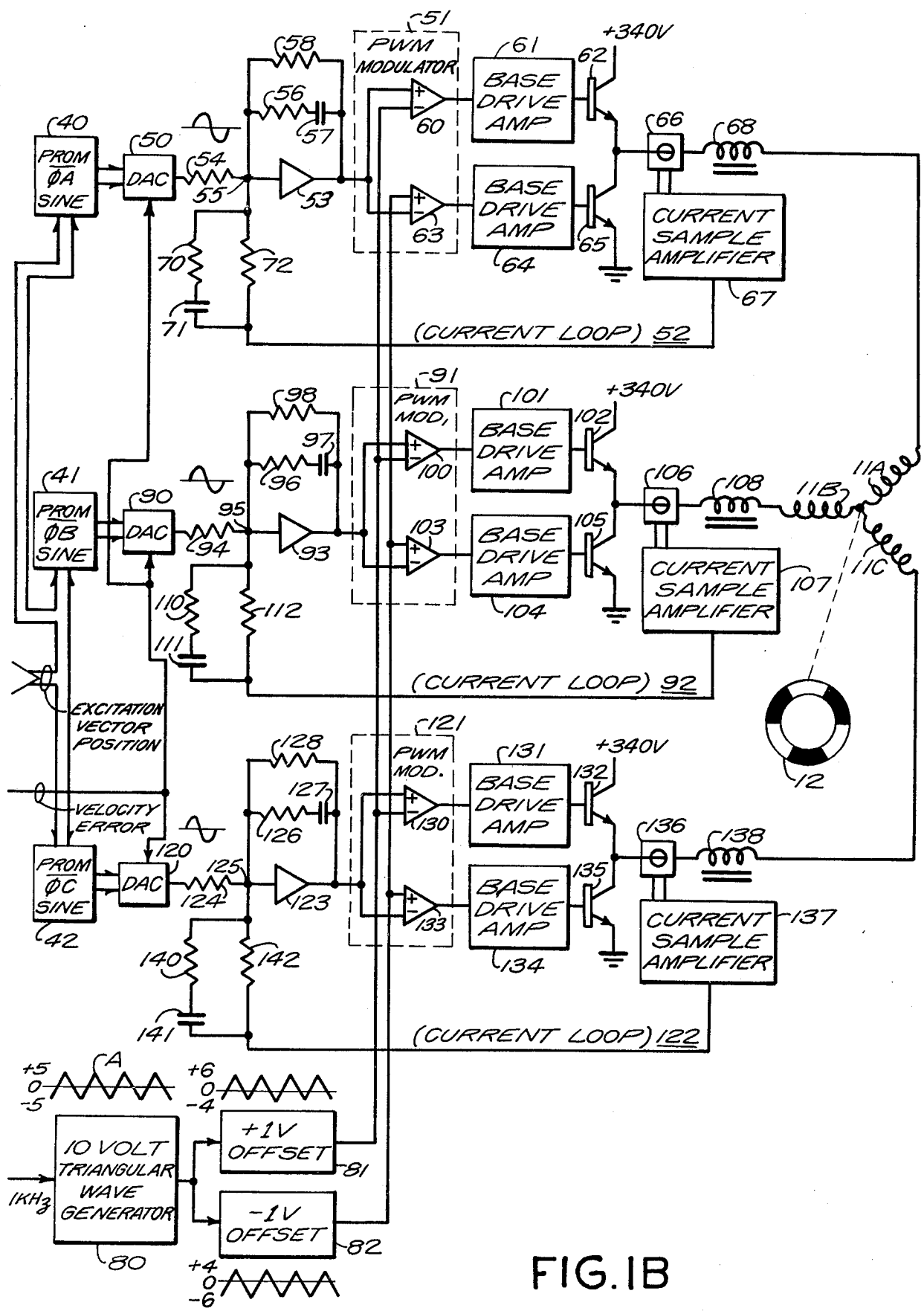

The overall schematic diagram for a motor control system according to one embodiment of the invention is shown in FIGS. 1A and 1B. The motor includes three stator windings 11A, 11B and 11C interconnected in a wye configuration and a six pole permanent magnet rotor 12. The same rotor is also shown to the left in FIG. 1A mechanically coupled to a DC tachometer 14 and a resolver 15. The DC tachometer can be of conventional design to provide a DC voltage proportional to rotor speed with a polarity indicative of direction. The resolver provides signals indicative of rotor position.

Each winding of the motor has a separate energization section (FIG. 1B) for generating a sinusoidal drive excitation of the correct amplitude, frequency and phase for the winding. The amplitude of the excitation current is controlled by a velocity servo loop wherein the speed indication from tachometer 14 is compared with a velocity command signal at terminal 18 to provide a velocity error signal (upper portion of FIG. 1A). The frequency of the sinusoidal excitation is controlled by the rotor position information from resolver 15 (lower portion of FIG. 1A) to maintain the excitation current in synchronism with the rotation of the motor. The electrical phase position of the sinusoidal excitation current is additionally controlled by an electrical signal which operates to vary the relative phase angle between the rotor and the stator field as a function of speed or some other adequate system parameter (center portion of FIG. 1A). As will be explained later in more detail, the effect of this phase control is to change the motor commutation point and to thereby achieve dynamic control of the torque constant $K_t$ (torque/ampere) and the back EMF constant $K_e$ (back EMF/RPM).

The circuit for producing the velocity error signal includes an operational amplifier 27. One brush of DC tachometer 14 is connected to ground whereas the other brush is connected to the input of amplifier 27 at summing junction 24 via a lead network consisting of the series combination of resistor 21 and capacitor 22 in parallel with resistor 20. Terminal 18 receives the velocity command in the form of an analog voltage having an amplitude indicating desired motor speed and a polarity indicating desired direction. Terminal 18 is connected to input of amplifier 27 via a resistor 23 and summing junction 24. A lead network consisting of a resistor 25 in series with a capacitor 26 is connected across amplifier 27. The lead networks including components 20-22 and 25-26 tend to anticipate rapid changes in the feedback loop and reduce overshoot and ringing.

The tachometer acts as a feedback element providing a continuous indication of the actual motor speed and direction. Amplifier 27 and the related components form a summing circuit which sums the actual speed and direction signal from the tachometer with the desired speed and direction as indicated by the command signal at terminal 18 to produce the difference at the output of amplifier 27 which is referred to as the "velocity error" signal. As will be explained later, the velocity error signal controls the amplitude of the motor excitation current and, hence, the motor speed. The speed of the motor is automatically controlled in servo loop fashion so that the actual motor speed is essentially the same as the desired speed indicated by the velocity command.

Resolver 15 is of a conventional design including a rotor winding and two stator windings in quadrature. The rotor winding is energized by a suitable alternating signal sin $\omega$ which may, for example, be 2500 Hz. If $\Phi$ represents the angle between the rotor and the stator of the resolver then the quadrature windings will produce the signals sin $\Phi$ sin $\omega$ and cos $\Phi$ sin $\omega$.

The resolver energizing signal and the signals produced by the quadrature windings are supplied to a resolver conversion circuit which interprets the signals and provides a corresponding binary indication of the resolver shaft position. An 8 bit binary code has been found adequate for the rotor position indication in accordance with this invention. The 8 bit code provides 256 position indications and, hence, rotor position is indicated to within 1.4 mechanical degrees. Of course, where finer positioning accuracy is desired, a code of greater than 8 bits can be used. In any event, the output of converter 31 is a digital word which at all times indicates the angular position of the rotor. As will be explained later, this digital word is used to control the motor excitation current so that the excitation is in syncronism with the rotor movement. The output of converter 31 is supplied to an 8 bit adder circuit 32.

The commutation point is controlled by shifting the phase of the stator excitation current relative to the rotor position. This control is achieved by adding in a value, hereinafter called torque angle factor, taken from programmable readonly memory 38 in response to the speed signal provided by tachometer 14. Resistors 34 and 35 are connected across tachometer 14 forming a voltage divider for scaling the tachometer voltage The junction of the resistors is connected to the input of a buffer amplifier 36. The output of amplifier 36 is connected to an analog to digital converter 37 which produces a digital word indicating rotor speed. This digital word is then used as the address for PROM 38. The output of the PROM therefore provides torque angle factors as a function of rotor speed. The PROM output is supplied to adder 32 and is there added to the position indication from converter 31.

For the velocity servo system illustrated in FIGS. 1A and 1B, torque angle factors are recorded in PROM 38 which provide a quadrature phase relationship between the rotor field and the rotating magnetic stator field at low speeds and a linearly increasing phase relationship as speed increases. The phase at maximum speed can be shifted as much as 90° relative to the quadrature phase at zero speed. Since any desired torque angle factors can be programmed into PROM 38, the relationship of phase angle to speed can be other than linear. Also, particularly in position servo systems and torque servo systems, factors other than speed may be used to select desired torque angle factors.

When the torque angle factor from PROM 38 is added to the position indication from converter 31 in adder 32, the result is a digital word representing the desired and pre-programmed position of the stator magnetic vector for any given speed. The adder output is supplied to a multiplier 33 which provides the pole compensation. This circuit converts the desired stator vector position at the output of adder 32, which is expressed in mechanical degrees, into a proper stator excitation control signal expressed in electrical degrees. For a six pole motor in the illustrative embodiment, the required compensation is provided by a multiply-by-three circuit 33 since one complete electrical cycle (360 electrical degrees) corresponds to one-third of rotor revolution (120 mechanical degrees). In general, the output of adder 32 is multiplied by the number of pole pairs in the motor to obtain a digital word hereinafter referred to as the desired excitation vector position.

The drive circuits shown in FIG. 1B provide the excitation currents for windings 11A, 11B and 11C which are sinusoidal and displaced from one another by 120 electrical degrees.

The excitation vector position is converted into digital sine wave values by programmable read only memories (PROMs) 40, 41 and 42 which are programmed to receive the excitation vector position value as address and to produce corresponding digital sine wave values. The PROMs are programmed so that in response to any particular vector indication they produce digital sine wave values displaced from one another by 120 electrical degrees.

The digital output indications from PROMs 40, 41 and 42 are supplied, respectively, to digital to analog converters (DAC's) 50, 90 and 120 which convert the digital sine wave values into analog values i.e. synthesized sine waves. DAC's 50, 90 and 120 are of the analog multiplying type capable of multiplying the digital conversion result with another analog signal. The velocity error signal is supplied to each of the DAC's and controls the amplitude of the sine wave signals produced thereby.

Thus, the outputs of DAC's 50, 90 and 120 are three synthesized sine wave voltage signals displaced from one another by 120 electrical degrees.

The frequency of the winding excitation currents is synchronous with the rotor movement and the phase is a function of the rotor position with respect to the stator. The phase of the winding excitation is additionally controllable as a function of speed or some other adequate system parameter.

The sinusoidal voltage signal appearing at the output of DAC 50 is supplied to a pulse width modulator 51 which produces pulse width current excitation to winding 11A of the motor. The amplitude of current supplied to the winding is controlled by current loop 52.

More specifically, the output of DAC 50 is connected to the input of an operational amplifier 53 via a resistor 54 and a summing junction 55. A lead network consisting of the series combination of resistor 56 and capacitor 57 in parallel with a resistor 58 is connected across the operation amplifier. The amplifier output is connected to the negative input terminal of a comparator 60 and to the positive input terminal of a comparator 63. The output of comparator 60 is coupled to the base of a transistor via a base drive amplifier 61. The output of comparator 63 is coupled to the base of transistor 65 via a base drive amplifier 64.

Transistors 62 and 65 are both NPN power switching transistors selected to handle the current requirements for the motor being controlled. The collector of transistor 62 is connected to a +340 volt supply, while the emitter thereof is connected to winding 11A through an inductor 68. The collector of transistor 65 is also connected to winding 11A through inductor 68 while the emitter of transistor 65 is connected to ground. Thus, when transistor 62 is conductive, winding 11A is connected to the positive supply whereas when transistor 65 is conductive, the winding is connected to ground. The inductor in series with the motor winding decreases ripple currents and associated motor heating.

The common lead from transistors 62 and 65 to inductor 68 passes through a ferrite core 66 having a linear Hall effect detector embedded therein and so located as to sense the magnetic flux in the core. The Hall detector is connected to a current sample amplifier 67. As current passes through the conductor, it creates a magnetic flux in core 66 which is sensed by the Hall detector and the amplifier in turn produces a voltage output proportional to the current passing through the lead.

The output of amplifier 67 provides the feedback to summing junction 55 to complete the current control loop. More specifically, the output of amplifier 67 is connected to summing junction 55 via a lead network, including the series combination of resistor 70 and capacitor 71 in parallel with a resistor 72. The lead networks 70-72 and 56-58 tend to anticipate rapid signal changes and reduce overshoot and ringing in the control loop.

The pulse width modulator (PWM) 51 which includes comparators 60 and 63 receives triangular wave signals originating from a triangular wave generator 80. The triangular wave has a suitably high repetition rate such as 1 KHz and ranges from +5 volts to −5 volts peak-to-peak. The triangular wave from generator 80 is offset by +1 volt in an offset circuit 81 to provide a triangular wave having a peak-to-peak range of +6 volts to −4 volts which is supplied to the negative input terminal of comparator 63. The triangular wave from generator 80 also passes through −1 volt offset circuit 82 to provide a triangular wave with peak-to-peak values ranging from +4 volts to −6 volts which is supplied to the positive input terminal of comparator 60.

Figure 2:
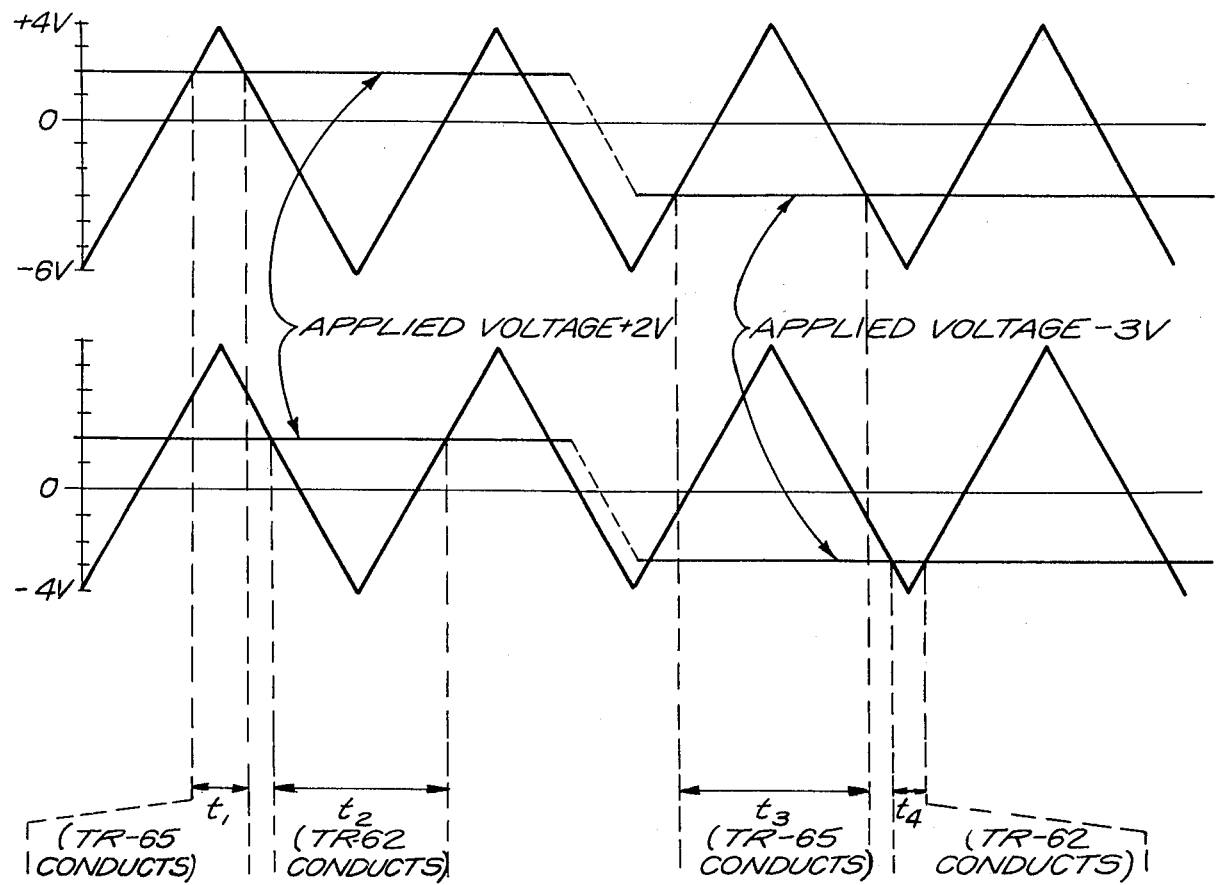
FIG. 2 is a timing diagram illustrating operation of the pulse width modulation utilized in FIG. 1B.

The operation of the pulse width modulator is illustrated in FIG. 2 which shows the two offset triangular waves applied to comparators 60 and 63. If the applied signal (output of amplifier 53 in FIG. 1B) has a +2 volts value, for example as shown to the left in FIG. 2, comparator 63 produces a logic 1 output for the interval to $t_1$ during which the applied signal is more negative than the triangular wave. During interval $t_1$ transistor 65 (FIG. 1B) is conductive. During the remainder of the triangular wave cycle the comparator produces a logic 0 output and therefore transistor 65 is nonconductive. Comparator 60, on the other hand, produces a logic 1 signal during interval $t_2$ when the applied signal is more positive than the triangular wave and thereby renders transistor 62 conductive. During the remainder of the cycle transistor 62 is nonconductive since the applied signal is more positive than the triangular wave signal.

Another example is shown to the right in FIG. 2 where the applied signal has a value of −3 volts. Under these circumstances, comparator 63 produces a logic 1 output to render transistor 65 conductive during interval $t_3$ whereas comparator 60 produces a logic 1 signal during interval $t_4$ during which time transistor 62 is rendered conductive.

Thus, it can be seen that as the applied signal becomes increasingly positive, transistor 62, which connects the winding to the positive source, becomes conductive for increasingly longer portions of each operating cycle whereas transistor 65, which connects the winding to ground, becomes conductive for increasingly shorter intervals. Accordingly, increasingly positive applied voltages cause increasingly larger currents to flow through the winding. On the other hand, as the applied signal becomes increasingly negative, the conductive period for transistor 65 increases and the conductive period for transistor 62 decreases. Accordingly, the winding is connected to ground for increasingly longer periods of time and, therefore, the current flow through the winding decreases.

It should be noted in FIG. 2 that an interval always exists between the times when the two transistors are conductive. This interval is as a result of the voltage offsets provided by circuits 81 and 82. This interval provides a short dead space to insure that both transistors never become conductive simultaneously to short circuit the power supply.

Thus, the current supplied to the winding is controlled by current loop 52 so that the current is proportional to the potential appearing at the output of DAC 50. As the output of DAC 50 increases, the output of amplifier 53 tends to increase thereby increasing the conductive interval for transistor 62 and the current supplied to the winding. The increase in current is detected by amplifier 67 which provides an increased feedback signal to amplifier 53 to limit the increase to the value indicated by the applied potential.

Similarly, components 91–112 form a current control loop that applies current to winding 11B proportional to the synthesized sinusoidal voltage appearing at the output of DAC 90 and components 121–142 form a current control loop that applies current to winding 11C porportional to the synthesized sinusoidal voltage appearing at the output of DAC 120.

Figure 3:
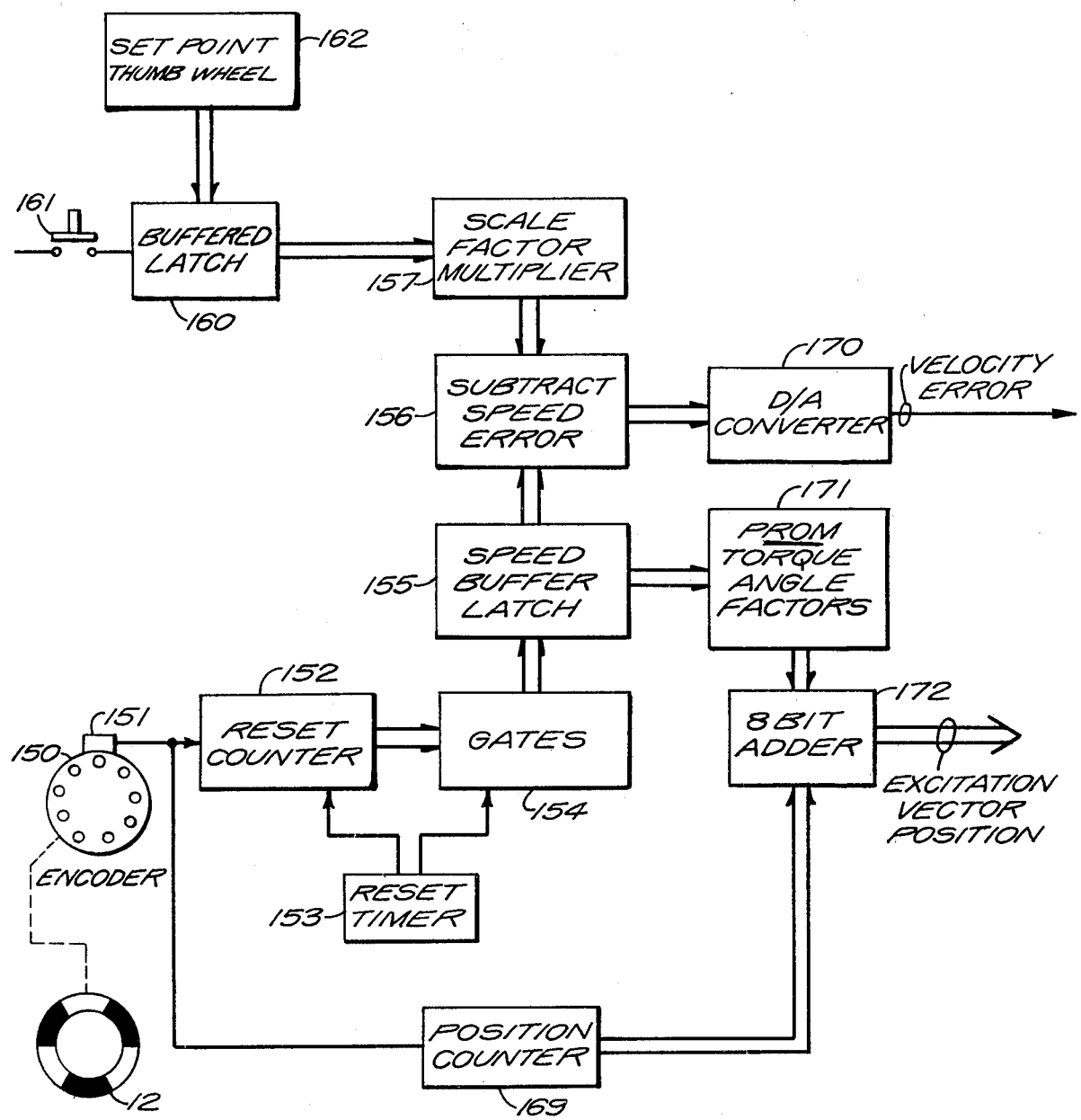
FIG. 3 is a partial schematic block diagram illustrating another embodiment according to the invention.

An alternative embodiment for producing the velocity error signal and the excitation vector position indication is shown in FIG. 3. In this embodiment both the position indication and the speed indication are derived from the same encoder disc 150 coupled to the rotor 12 of the motor. A sensor 151 coupled to the encoder disc produces a pulse train where each successive pulse corresponds to an increment of motion.

The pulse train from sensor 151 is supplied to a position counter 169 which maintains a running count. The output of the counter is therefore a digital word indicative of the rotor position.

The pulse train from sensor 151 is also supplied to a reset counter 152. The digital outputs of counter 152 are supplied to gates 154 which in turn supplies the indication to a speed buffer latch 155. A reset timer 153 periodically supplies pulses to counter 152 to reset the counter and at the same time supplies pulses to gates 154 to transfer the count from counter 152 to buffer latch 155. Since counter 152 counts pulses over a preset period of time, the count at time of reset is proportional to rotor speed and therefore the transferred count appearing at the output of the latch circuit 155 represents the actual motor speed.

The output of latch circuit 155 is used as the address indication to a PROM 171 which is programmed to contain the appropriate torque angle factors. The output of PROM 171 is supplied to adder 172 and represents a torque angle factor selected as a function of motor speed. Adder 172 adds the torque angle factor to the position indication from counter 160 to derive the excitation vector position indication.

The command signal indicating desired motor speed is in digital form as may be supplied by a thumbwheel unit 162. When the thumbwheel unit is set to the appropriate value, the indication can be transferred to a buffered latch circuit 160 by actuation of switch 161. The output of latch circuit 160 indicates the desired speed and passes through a suitable scale factor multiplier 157 to a subtract circuit 156. Subtract circuit 156 also receives the actual speed indication from latch circuit 155 and determines the difference between the actual speed and the desired speed. The output of subtract circuit 156 is the velocity error which can be converted to an analog signal by a digital to analog converter 170.

To complete the system, the velocity error signal from converter 170 (FIG. 3) is supplied to DAC's 50, 90 and 120 (FIG. 1B) to control the amplitude of the motor excitation current, and the excitation vector position indication from adder 172 (FIG. 3) is supplied to PROM's 40, 41 and 42 (FIG. 1B) to control frequency and phase of the excitation currents.

Although only a few illustrative embodiments have been described in detail, it should be apparent that there are other embodiments within the scope of this invention. The invention is more particularly defined in the appended claims.

What is claimed is:

1. A motor control system for a brushless DC motor comprising:
   a brushless DC motor including
   stator windings;
   a permanent magnet rotor and
   a position indicator for indicating the position of said rotor relative to said stator windings;
   excitation current generating circuit means responsive to said position indication from said position indicator and connected to provide sinusoidal excitation current to said stator windings, said sinusoidal excitation current being incrementally synthesized according to digital values; the frequency of said sinusoidal excitation current being controlled according to said position indication to create a rotating magnetic field synchronous with the rotation of said rotor; and
   torque angle control circuit means coupled to said excitation current generating circuit means to control the phase of said sinusoidal excitation current to dynamically control the angle between said rotating magnetic field created by said stator winding and the rotor position.

2. A motor control system according to claim 1 further comprising speed sensing means coupled to said rotor to provide an indication of rotor speed and, wherein said speed sensing means is coupled to said torque angle control circuit means so that said phase of said sinusoidal excitation current varies as a function of rotor speed.

3. A motor control system according to claim 2 wherein said phase of said sinusoidal excitation current varies linearly as a function of rotor speed.

4. A motor control system according to claim 1 wherein said sinusoidal excitation current corresponds to voltage values created incrementally from pre-recorded sine values selected in accordance with position indications from said position sensor.

5. A motor control system according to claim 4 wherein said sine values are pre-recorded in a read-only-memory.

6. A motor control system according to claim 4 wherein said excitation current is created by pulse width modulation in accordance with said voltage values.

7. A motor control system in accordance with claim 1 further comprising:
   speed sensing means connected to provide an indication of the actual speed of said rotor;
   means for receiving a command signal indicating the desired motor speed; and
   servo means for comparing said indication of actual speed to the indication of desired speed to derive an error signal for controlling the amplitude of said excitation current.

8. A motor control system for a brushless DC motor comprising;
   a brushless DC motor including stator windings;
   a permanent magnet rotor and a position indicator for indicating the position of said rotor relative to said stator windings;
   excitation current generating circuit means responsive to said position indication from said position indicator and connected to provide sinusoidal excitation current to said stator windings, the frequency of said sinusoidal excitation current being controlled according to said position indication to create a rotating magnetic field synchronous with the rotation of said rotor;
   torque angle control circuit means coupled to said excitation current generating circuit means to control the phase of said sinusoidal excitation current to dynamically control the angle between said rotating magnetic field created by said stator winding and the rotor position;
   speed sensing means coupled to said rotor to provide an indication of rotor speed and, wherein said speed sensing means is coupled to said torque angle control circuit means so that said phase of said sinusoidal excitation current varies as a function of rotor speed; and
   wherein said torque angle control circuit includes a read-only-memory having torque angle factors pre-recorded therein, wherein said speed sensing means provides digital speed indications used as addresses for said read-only-memory to select appropriate torque angle factors, and wherein said phase of said sinusoidal excitation current is determined by the selected torque angle factor.

9. A motor control system for a brushless DC motor comprising:
   a brushless DC motor including
   a plurality of stator windings and a permanent magnet rotor;

a position indicator for providing digital indications of the rotor position;

a speed indicator for providing digital indications of the rotor speed;

a memory having torque angle factors recorded therein;

means for selecting torque angle factors from said memory according to the digital indication of rotor speed and adding the selected torque angle factor to the digital indication of rotor position to derive an excitation vector position indication; and excitation current generating means for applying sinusoidal excitation currents to said windings having value proportional to sine values incrementally selected in accordance with said excitation vector position indication.

10. A motor control system according to claim 9 wherein said position indicator includes a resolver coupled to the rotor shaft and conversion circuits for providing said digital indication of rotor position therefrom and wherein said speed indicator includes a tachometer coupled to the rotor shaft and an analog to digital converter for providing said digital indication of rotor speed therefrom.

11. A motor control system according to claim 9 further including an encoder coupled to the rotor shaft and wherein said digital indication of rotor position are provided by a counter responsive to pulses from said encoder, and wherein said digital indication of the rotor speed are provided by a reset counter responsive to pulses from said encoder.

12. A motor control system according to claim 9 including additional memory having sine values prerecorded therein and wherein said excitation vector position indication is used as memory addresses to provide said incrementally selected sine values.

13. In a motor control system for supplying excitation current to multiple stator windings of the motor, the combination of:

a separate read only memory for each winding, said memories having sine values recorded therein displaced from one another in accordance with the phase displacement of the motor windings;

conversion means for providing analog voltages corresponding to the digital outputs of said memories;

pulse width modulators connected to provide current pulses to said windings having pulse widths corresponding to analog voltage values derived from said conversion means;

current loops for sensing the current flow to the winding and adjusting the voltages applied to said pulse width modulators so that the winding excitation currents are proportional to the analog voltages produced by said conversion means; and control circuits for providing a digital indication to said memories to indicate the desired winding excitation vector position.

14. The system according to claim 13 wherein said conversion means includes means for modifying the amplitude of the analog voltages produced thereby to in turn control the amplitude of the winding excitation current.

15. The system according to claim 13 wherein said pulse width modulators each include two transistor switches alternately rendered conductive, one of said transistors being operable to connect the associated winding to a power supply and the other of said transistors being operable to connect the associated winding to ground.

16. The system according to claim 15 wherein a dead space during which neither of said transistors is conductive exists between each alternation of conductive states.

17. A motor control system for a brushless DC motor comprising:

a brushless DC motor including stator windings;

a permanent magnet rotor and a position indicator for indicating the position of said rotor relative to said stator windings;

excitation current generating circuit means responsive to said position indication from said position indicator and connected to provide sinusoidal excitation current to said stator windings, the frequency of said sinusoidal excitation current being controlled according to said position indication to create a rotating magnetic field synchronous with the rotation of said rotor; and torque angle control circuit means coupled to said excitation current generating circuit means to control the phase of said sinusoidal excitation current to dynamically control the angle between said rotating magnetic field created by said stator winding and the rotor position said angle between said rotating magnetic field and said rotor position being controlled according to digital torque angle factors.

18. A motor control system according to claim 17 further comprising speed sensing means coupled to said rotor to provide an indication of rotor speed and, wherein said speed sensing means is coupled to said torque angle control circuit means so that said phase of said sinusoidal excitation current varies as a function of rotor speed.

* * * * *